United States Patent [19]
Ohta et al.

[11] Patent Number: 5,484,048
[45] Date of Patent: Jan. 16, 1996

[54] RUBBER TIRE INDIVIDUAL SEPARATION TRANSPORT APPARATUS

[75] Inventors: Yasuhiro Ohta, Sakurai; Masaru Umemoto, Kashiwara; Kenryo Kashiwagi, Yao, all of Japan

[73] Assignee: Tsubakimoto Chain Co., Osaka, Japan

[21] Appl. No.: 222,100

[22] Filed: Apr. 4, 1994

Related U.S. Application Data

[63] Continuation of Ser. No. 40,405, Mar. 31, 1993, Pat. No. 5,307,922.

[30] Foreign Application Priority Data

Jan. 11, 1993 [JP] Japan ................................. 5-17858
Jan. 11, 1993 [JP] Japan ................................. 5-17859

[51] Int. Cl.⁶ .................................................. B65G 47/24
[52] U.S. Cl. ........................... 198/397; 198/453; 198/443
[58] Field of Search ................................. 198/443, 449, 198/453, 690.2, 698, 699, 397

[56] References Cited

U.S. PATENT DOCUMENTS

| | | | |
|---|---|---|---|
| 2,745,537 | 5/1956 | Cadman | 198/397 |
| 3,326,351 | 6/1967 | Ross et al. | 198/690.2 X |
| 3,934,718 | 1/1976 | Kupper | 198/453 |
| 4,082,177 | 4/1978 | Aidlin et al. | 198/443 X |
| 4,664,248 | 5/1987 | Goodman et al. | 198/453 |
| 4,811,832 | 3/1989 | Niemann | 198/443 |
| 4,909,375 | 3/1990 | Cotic et al. | 198/690.2 X |
| 4,932,513 | 6/1990 | Michimae et al. | 198/443 |
| 5,236,077 | 8/1993 | Hoppmann et al. | 198/397 |
| 5,307,922 | 5/1994 | Ohta et al. | 198/690.2 |

*Primary Examiner*—Joseph E. Valenza
*Attorney, Agent, or Firm*—Eugene E. Renz, Jr.

[57] ABSTRACT

A rubber tire individual separation transport apparatus including a rubber tire individual conveyor surface section and a rubber tire sliding surface section separately formed on a slat conveyor surface, with the conveyor having a horizontal charge zone, a sharply inclined individual transport zone, and a horizontal discharge zone. Also included is an upright plate erected for contact with the peripheral surface of a rubber tire at one end of each slat in the individual conveyor surface section. A support plate of such a size as to support only one rubber tire laid flat on said individual conveyor surface is mounted at a larger pitch in the direction of transport than the maximum diameter of the rubber tire being conveyed. A stationary side wall is erected along the side edge of the other end of the slat of the sliding surface section. Cooperative action between the selected tire and the side wall causes frictional force on unwanted tires to cause them to fall back to the supply of tires.

12 Claims, 5 Drawing Sheets

RUBBER TIRE INDIVIDUAL SEPARATION TRANSPORT APPARATUS

This is a continuation of application Ser. No. 08/040,405 filed on Mar. 31, 1993 now U.S. Pat. No. 5,307,922.

FIELD OF THE INVENTION

The present invention relates to apparatus for transporting and separating used tires. More particularly, the present invention relates to an individual separation transport apparatus suitable for transport of used tires or waste tires, which are to utilized as an auxiliary fuel for cement calcination and other continually operating furnaces and the like.

BACKGROUND OF THE INVENTION

Waste rubber tires have become an important auxiliary fuel for calcination of cement. In recent years, these tires are passed through a preheater and charged into a kiln for burning. Since the kiln is operated continuously over the 24 hour period, and since the kiln requires temperature controls, the number of tires charged to the furnace per interval of time is determined by calculating the weight and calories of the tires charged at the charging point of the preheater. It is therefore necessary to feed waste tires into the preheater one by one.

It has been known to separate and convey waste rubber tires such as automobile tires and the like one by one from a stack of tires. Techniques are disclosed in Japanese Patent Publication No. 11808/1982. In this design, an individual separating technique is employed using a water stream with which it is necessary to utilized a large of pool for holding a multitude of tires. As the tires float, this large number of tires is necessary in order to continuously supply tires to the preheater. Moreover, since the pool of water is outdoors, the flow tires will be occasionally disturbed by an outside airflow traveling counter to the water stream. More importantly, water is likely to enter the interior space of the tire, causing difficulty and requiring the removal of the water.

Also known is Japanese Patent Publication No. 11955/1988 which describes a transport technique for classifying the separated waste tires by size. This disclosure does not describe a technique for separating and transporting one tire from a plurality of waste tires which are being carried together. There is no provision for separating those tires from a bulk quantity or pile of tires.

Accordingly, it is an object of the present invention to provide an apparatus for separating pluralities of rubber tires into individual separate spaced apart tires being carried on a transport apparatus.

Another object of the present invention is to provide a separation and transport apparatus for large quantities of tires, in which the quantity of tires is separated so that only one tire at a time is removed from the plurality for transport to a charging port of a preheater or other device for using the individual tires singely and one at a time.

Other objects will appear hereinafter.

SUMMARY OF THE INVENTION

It has now been discover that the above and other objects of the present invention maybe accomplished in the following manner. Specifically, it has been discovered that a rubber tire individual separation transport apparatus can be provided in which a plurality of rubber tires are carried through a sharply upwardly inclined individual transport zone such that all but one of the tires are dropped back to the plurality. One tire is supported by each support plate to individually separate and transport one tire at a time.

A conveyor surface of a slat conveyor is divided into a first section which operates as a rubber tire individual conveyor surface section. A rubber tire sliding surface selection is also provided in which an upright plate is erected at the end of each slat on a side edge of the individual conveyor surface section. A plurality of support plates which are each high and wide enough to support only one tire laid flat on the conveyor surface section are then mounted to engage a tire in the direction of transport. The support plates are aligned at a larger pitch than the maximum diameter of the tires being conveyed so that tires do not get wedged between two such plates.

A guide member is fixedly installed on the other side edge of the sliding surface section in the sharply inclined individual transport zone for the purpose of scooping or lifting a tire which is carried that far up the zone, causing it to fall back on the sliding surface and return to the plurality of tires.

In operation, the single tire which is supported on the support plate travels up a sharply inclined individual transport zone in a stabilized position lying flat on the surface of the conveyor. However, if other tires remain on the slat surface, such as by being held between the one tire on the support plate and the other side wall, it is necessary to cause those tires to return to the plurality of tires in the supply.

The one tire on the support plate is prevented from moving sideward by the upright plate and the side wall to which it is adjacent, such a side wall being fixedly mounted along the side edge of the sliding surface section as it travels upward. The other side of the slat in the sharply inclined individual transport zone also includes a side wall which is fixedly mounted along the side edge of the sliding surface as the surface travels upward. If one of the undesired accompanying tires contacts the stationary side wall, this will cause that unwanted tire to rotate. Other accompanying tires moving upward together in contact with this rotating tire are also rotated by that rotational action. Eventually, a tire comes into contact with the one tire supported on the support plate. The one desired tire is in contact with both the upright plate mounted on the slat and the side wall. Since the tire goes upward together with the slat and side wall, this tire will not rotate. Accordingly, the entire plurality of unwanted accompanying tires are guided to the sliding section, sliding down on to the slat conveyor and back into the horizontal charge zone.

Sometimes, a tire may slip on the stationary side wall due to the presence of oil on the peripheral surface of the tire. Thus the tire will not rotate and consequently will not impart rotation movement to the other accompanying tires. In this case the concern is that a plurality of tires are likely to be carried together into the horizontal discharge zone. To prevent this, a tire scooping guide is employed along one edge of the zone to scoop or lift the accompanying tires, thus insuring the elimination of all those unwanted tires accompanying the desired tire in the individual conveyor surface section.

BRIEF DESCRIPTION OF THE DRAWINGS

These and other objects of the present invention and the various features and details of the operation and construction thereof are hereinafter more fully set forth with reference to the accompanying drawings, where:

FIG. 5b is a schematic view illustrating the use of the embodiment shown in FIG. 5a.

DETAILED DESCRIPTION OF THE PREFERRED EMBODIMENT

Figure 1:
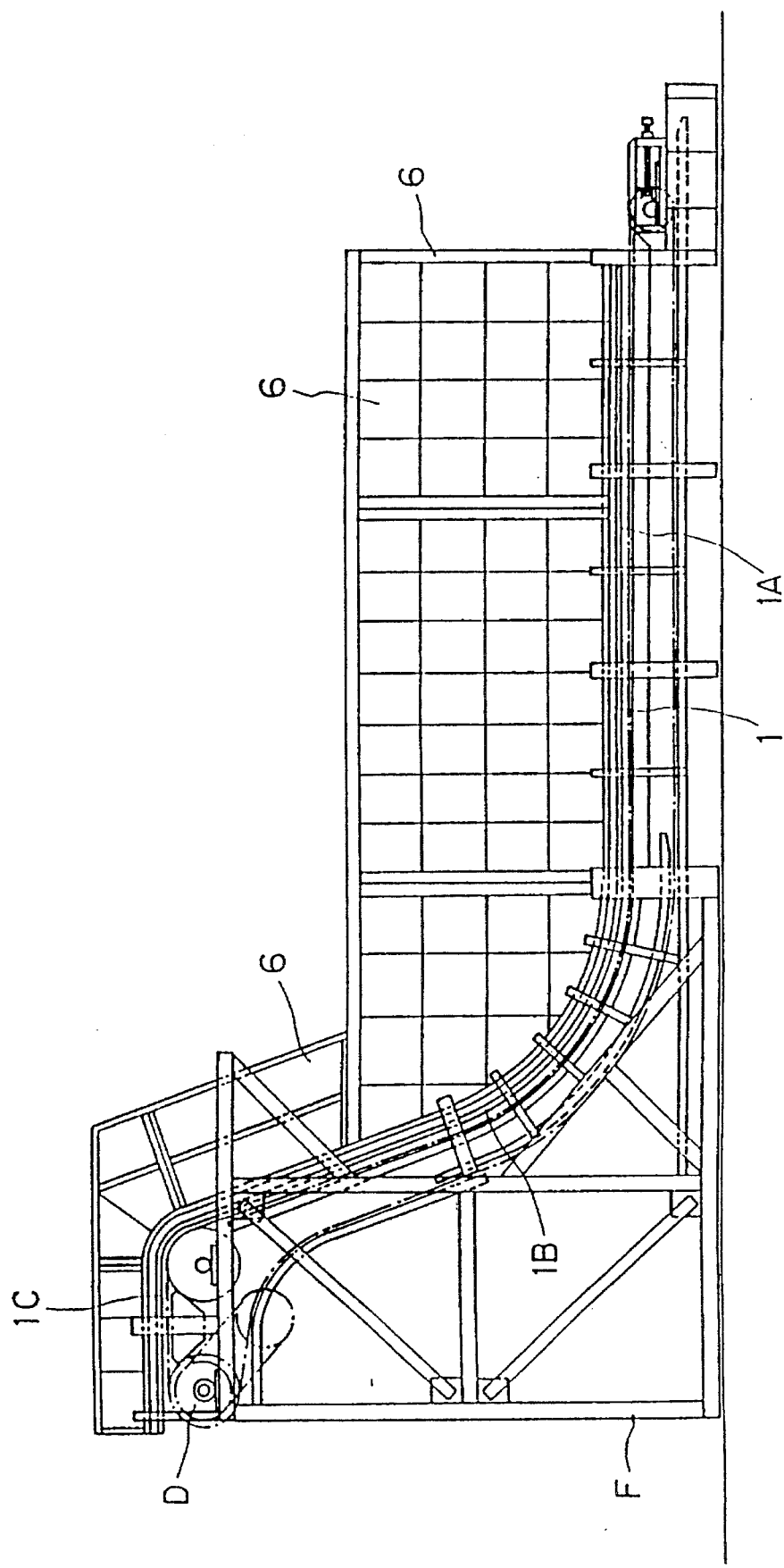
FIG. 1 is a front view of an embodiment of the present invention.

As shown in the drawings, the present invention comprises a rubber tire individual separation transport apparatus. Shown in FIG. 1 is a front view of the apparatus in which waste tires are transported from right to left as seen in the drawing and also are transported from an accompanying state where a plurality tires in various orientations are in mutual contact with one another to a zone in which individual tires are separated from the mass or plurality of tires for deliver to a discharge zone at the top left portion of the apparatus as illustrated.

The apparatus of the present invention includes an endless slat conveyor 1, having an approximate Z-shaped transport route for feeding a scattering or collection of rubber tires such as automobile tires. It is to be appreciated that the present invention is suitable for use with other objects that can be transported on a conveyor from an conglomeration or plurality of objects to a single, individually transported row of objects. The Z-shape transport route includes a horizontal charge zone 1A for feeding a plurality of rubber tires. It also includes a sharply inclined individual transport zone 1B which is connected to the charge zone 1A and in which individual tires are separated from the collection of tires. Finally, a horizontal discharge zone 1C is connected to the sharply inclined individual transport zone 1B. The entire slat conveyor is supported on a frame F and driven by a drive pulley D.

Figure 2:
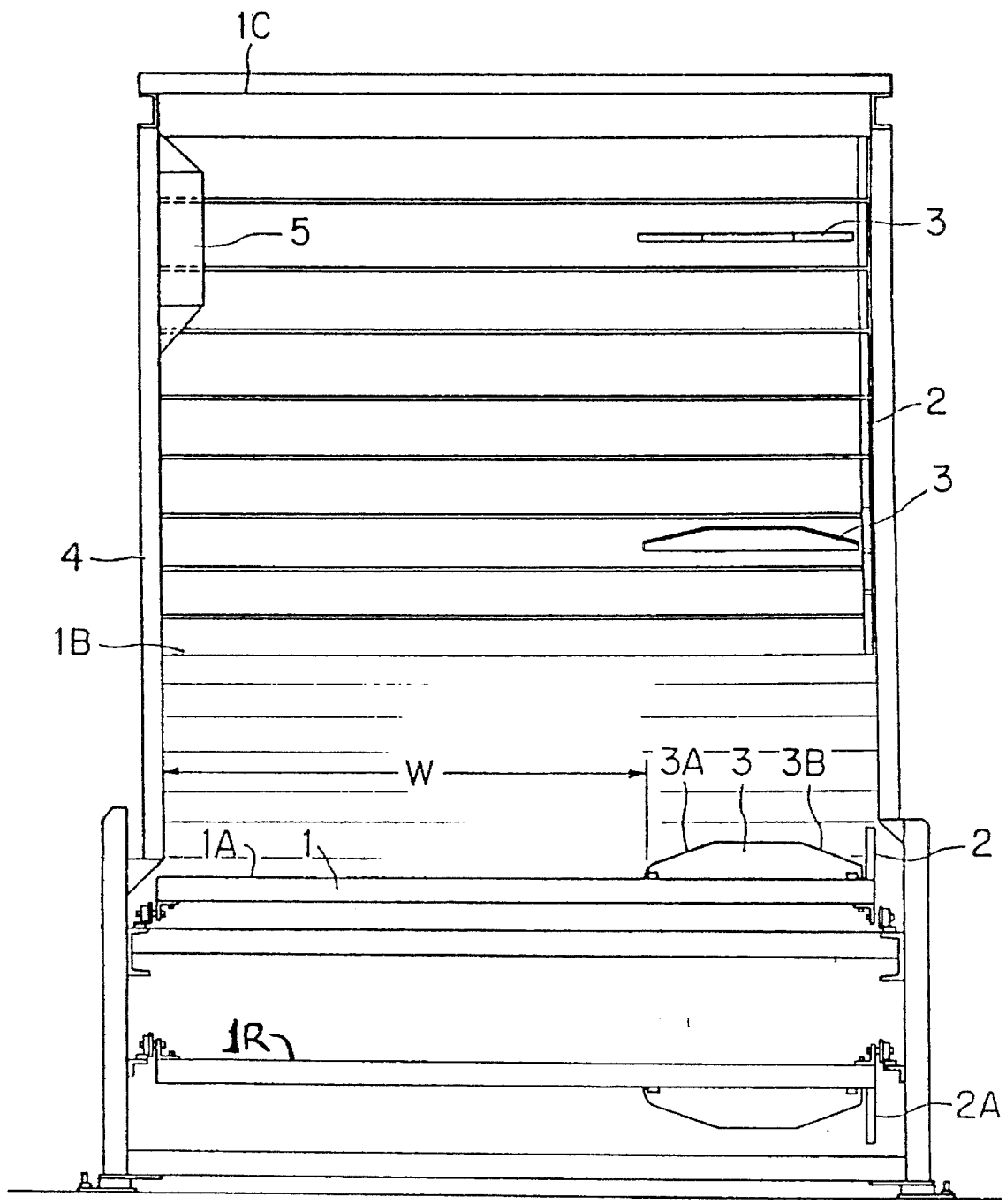
FIG. 2 is an enlarged right side view of the apparatus shown in FIG. 1.

The surface of the individual separation conveyor 1 is divided into an individual conveyor surface section and a sliding surface section. In the individual conveyor surface section, as illustrated in FIG. 2, an upright or vertically aligned plate 2 is fixedly mounted on one end of the slats 1. Upright plate 2A is shown similarly attached to returning slat 1R. Also mounted on the conveyor 1 is a trapezoidal shaped tire support plate 3 mounted in a vertical orientation with respect to the surface of the conveyor. Support plate 3 has a height slightly less than the axial width of a rubber tire being process by the apparatus. Support plate 3 is also a little smaller or shorter in length than the diameter of the rubber tire. The support plate 3 functions to support the lower end of a rubber tires circumference in the sharply inclined transport section 1B. The length of the support plates 3 should be sufficient to securely position the tire in the event of a slight change in the orientation or position of the center of the tire.

Figure 3:
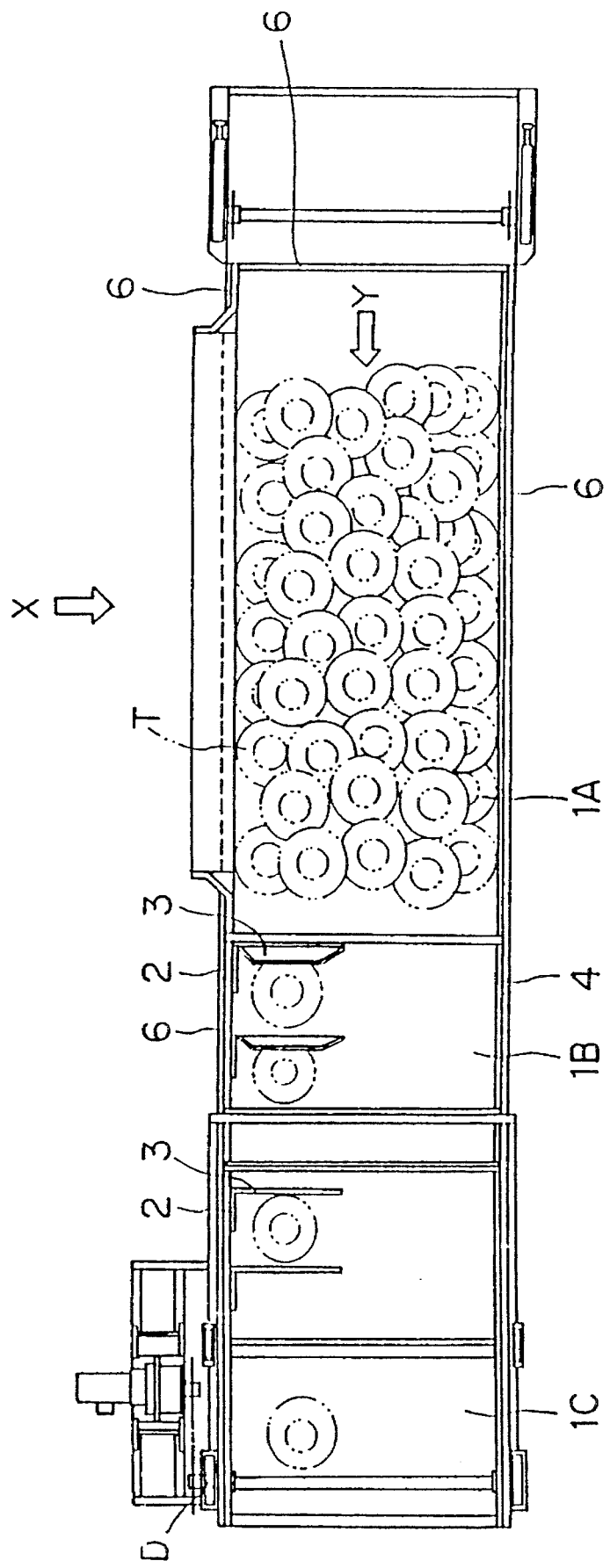
FIG. 3 is a plan view of the apparatus shown in FIG. 1.

As noted in FIG. 3, the mounting pitch between adjacent support plates 3 in the direction of transport is larger than the maximum diameter of a rubber tire to be individually separated and transported to prevent jamming of tires between two adjacent plates. The upwardly extending shape of the support plate 3 is in the form of a trapezoid, having gentle slopping surfaces 3a and 3b such that both ends of the top side are cut off.

At the other side of the sliding surface section of the conveyor is a side wall 4, installed upright or vertical along the other side edge of the conveyor apparatus 1. The width W between the stationary side wall 4 and the left end of support plate 3, as illustrated in FIG. 2, is larger than the maximum diameter of any rubber tire likely to be conveyed by the apparatus. This will allow any rubber tire falling between the support plate 3 and side wall 4 to slide down smoothly when it is in the sharply inclined transport section 1B.

Also mounted on stationary side wall 4 is a rubber tire scooping guide plate 5 which protrusively extends close to the sliding surfaces of conveyor 1B. Guide plate 5 is located preferably in the vicinity of the top end of the upward travel of section 1B.

Turning now to FIG. 1 again, it can be seen that the side edge of the individual transport surface section of slat conveyor 1 has side walls 6 mounted thereon in vertical alignment to prevent rubber tires from falling off the conveyor. In the horizontal charge zone 1A, stationary side walls 6 are also provided on the starting side of conveyor, thereby forming a hopper out of the three stationary walls 6.

The individual separating operation of the conveyor 1 is illustrated, in part, in FIG. 3. Rubber tires shown generally by T are discharged downward in the direction of arrow X from a rubber tire feed conveyor mounted above the horizontal charge zone 1A. These tires are scattered on the surface of the horizontal charge zone 1A of slat conveyor 1 as they fall and are transported in the direction of arrow Y by slat conveyor 1. As rubber tires reach the sharply inclined transport zone 1B, only one rubber tire is supported on each individual support plate 3. Support plate 3 is installed generally vertically so that the tire will be carried upward to be discharged out from the horizontal discharge zone 1C.

Figure 4:
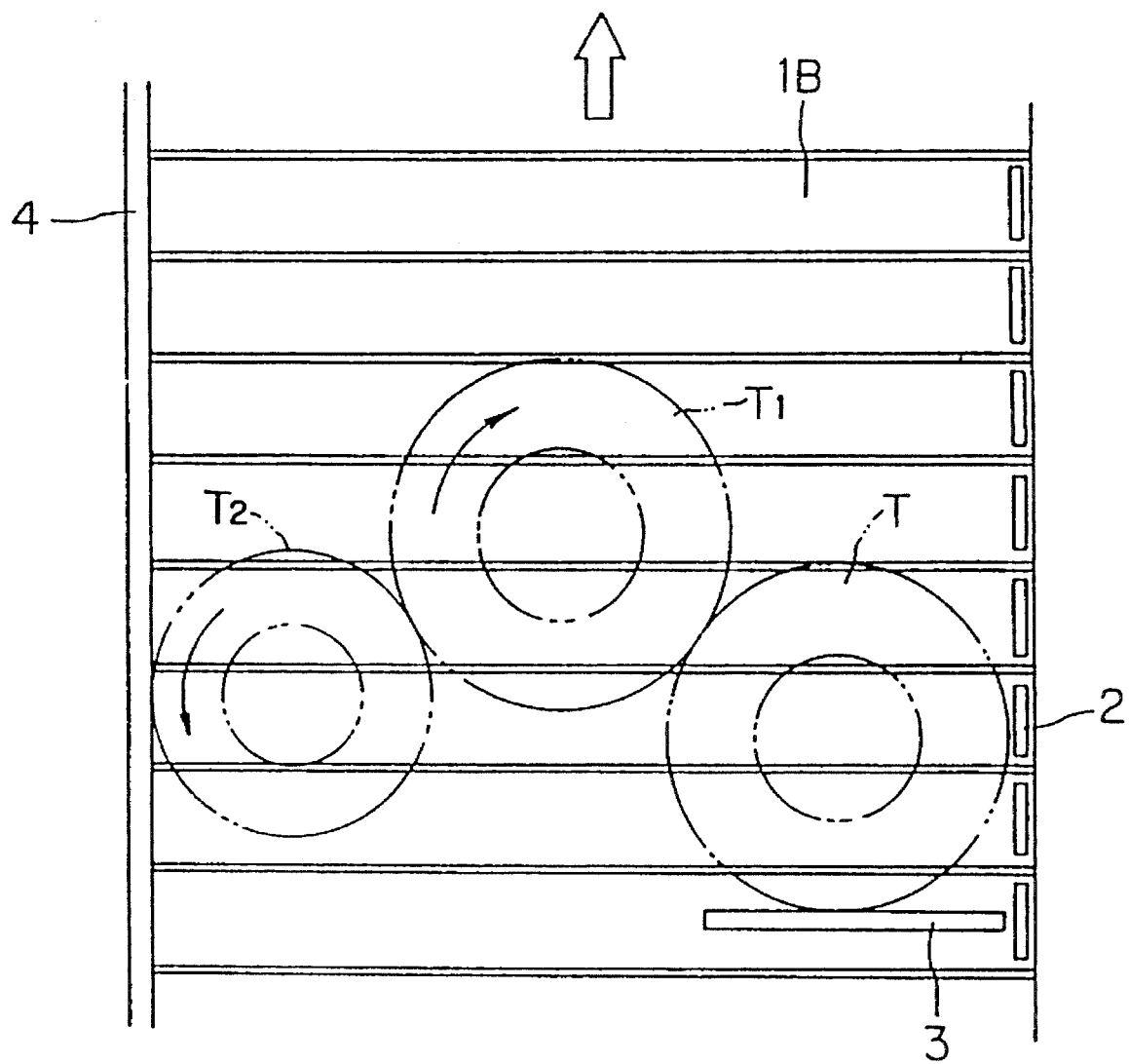
FIG. 4 is a schematic view illustrating the operation of a portion of the apparatus shown if FIG. 1.

Turning now FIG. 4, it can be seen that additional tires $T_1$ and $T_2$, for example, may remain associated with the desired tire and the entire mass of tires flows in a unseparated condition up the sharply inclined transport zone 1B. However, other tires $T_1$ and $T_2$ are not supported on the support plate 3, since that support plate 3 only accommodates one tire. All three tires are carried upward together. Tire $T_2$ contacts stationary side wall 4, causing tire $T_2$ to rotate in a counterclockwise direction as shown by the arrow on tire $T_2$. This motion thus causes tire $T_1$ to rotate in a clockwise direction as shown by the arrow on tire $T_1$. However, tire T which is supported on the support plate 3 and the upright plate 2 which itself is fixedly mounted on the conveyor slat 1, will prevent tire T from rotating. Consequently, as tire $T_1$ rotates clockwise, it is pushed out and up from between tires T and $T_2$. As $T_1$ it is separated from the unseparated condition at that time, $T_2$ slides down onto the slat in the horizontal charge zone 1A along with tire $T_1$ and other tires which have been accompanying the selected tire T. Because the conveyor is sharply inclined in zone 1B, all the tires other than the selected tire T will fall to thereby cause a separation of the desired tire T from the remaining tires. Each support plate 3 carries one tire so that a steady state of production, shown in FIG. 3 for example, is discharge out from horizontal discharge zone $C_1$.

Figure 5A:
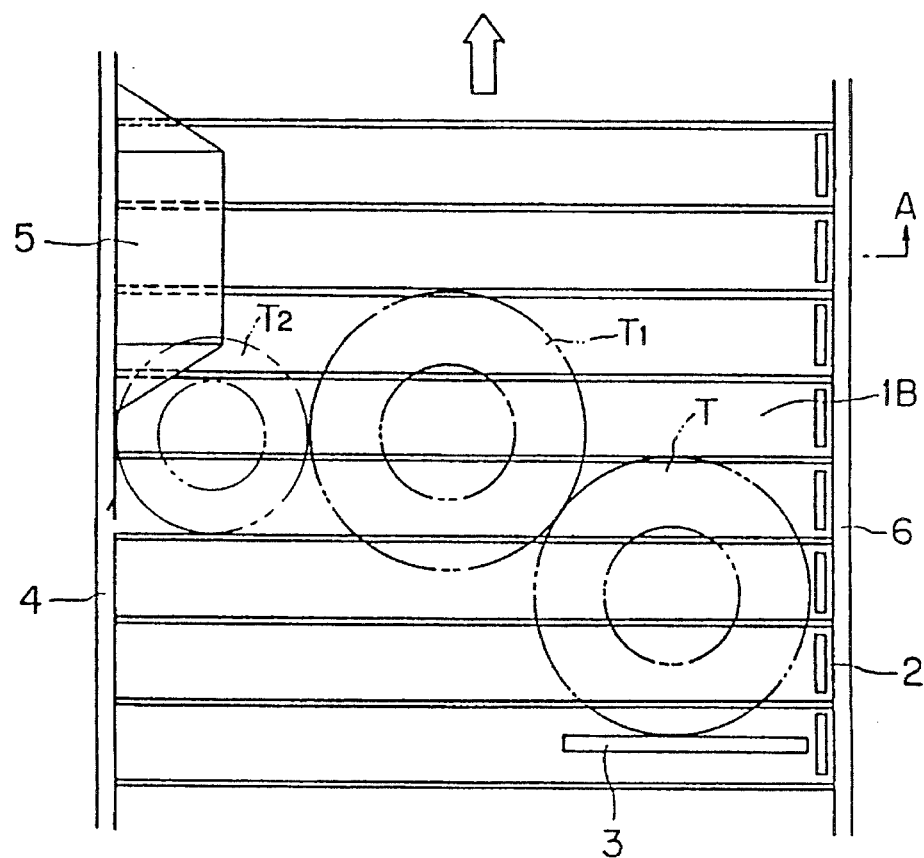
FIG. 5a is a schematic view illustrating one condition of operation of the apparatus of the present invention.
Figure 5B:
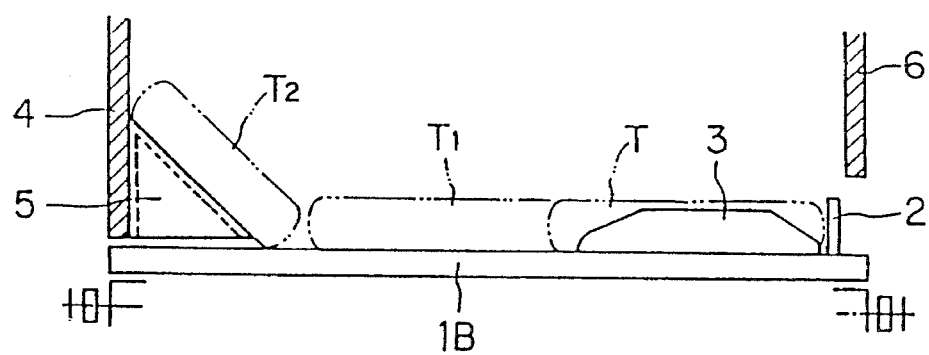

In some circumstances, the peripheral surface of an accompanying tire $T_2$ will be oily or for other reasons will slip as it contacts station side wall 4 and therefore not rotate. Such a tire will be elevated upon contact with scooping guide member 5 as particularly shown in FIG. 5a and FIG. 5b, which again will cause both tires $T_1$ and $T_2$ to be dropped to the support plate side on the horizontal discharge 1A.

Both the upstream and the downstream sides of guide member 5 are tapered. Thus, tires which contact this guide member are caused to separate from the desired tire T but cannot become stuck on a corner or edge of guide member 5.

As has previously been described, the support plate 3 has gently sloping sides 3a and 3b which prevent the possibility of a corner section catching the center of a tire. This prevents any disruption in the desired and planned flow of tires through the discharge zone 1C.

As can be seen from foregoing, the running surface of the slat conveyor 1 is divided into an individual conveyor surface section and a sliding surface section. A single rubber tire is separated from the others and carried by a support plate 3 and an upright plate 2 in the individual conveyor surface section. When a plurality of tires not supported by the support plate are carried upward in the sharply inclined individual transport zone of the slat conveyor, they are returned. These tires are rotated by the vertical plate 4 installed on the end section of slat of the individual conveyor along the stationary side wall erected on the side edge of the sliding surface section. This causes the tires to be separated and to drop from an unseparated condition to the horizontal charge zone 1A of the slat conveyor 1 as they are guided down the sliding surface section. In the horizontal discharge zone 1A, therefore, rubber tires are reliably discharged one by one, thereby obtaining an extremely important and automated dispensing of individual tires in spite of the high co-efficient of friction that tires surfaces have.

While the foregoing embodiments of the present invention have been shown, it will be understood by those skilled in the art that modifications and variations may be effected in these exemplarity embodiments without departing from the scope and spirit of the present invention.

What is claimed is:

1. Apparatus for conveying and separating annular objects of different diameters including a conveyor having an inclined section, a loading section adjacent one end of said section and a discharge area adjacent the opposite end of said inclined section and a discharge area adjacent the opposite end of said inclined section, said inclined section being moveable to transport annular objects from the loading zone to the discharge zone, said conveyor having a width sufficient to support two of said annular objects in a side-by-side relationship, said conveyor section positioned such that any line traversing said conveyor section and perpendicular to the edges thereof will be generally parallel to the horizontal;

a plurality of support plates on said conveyor section each of a size to support only one annular object laid flat on said conveyor and mounted at a larger pitch in the direction of transport than the maximum diameter of rubber annular objects being conveyed;

a stationary side wall along the side edge of said inclined portion remote from said support plates for guiding others of said annular objects supported on said inclined section and not supported by one of said support plates; and the traverse distance between the support plates and said side wall being greater than the diameter of annular objects being conveyed whereby annular objects not engaging on said support plates are returned to the loading zone.

2. The method for separating and transporting a quantity of annular objects on a conveyor system from a loading zone up an inclined section to a discharge zone wherein the conveyor surface consists of a plurality of slats;

supporting a plurality of annular objects each individually on one of a plurality of support plates, each of said support plates sized to support only one of said annular objects laid flat on said conveyor surface of the inclined section wherein the plate is at a larger pitch in the direction of transport than the maximum diameter of the annular objects being conveyed, said conveyor having a width sufficient to support two of said annular objects in a side-by-side relationship, said inclined conveyor section positioned such that any traversing said conveyor section and perpendicular to the edges thereof will be generally parallel to the horizontal; and guiding other annular objects in contact with said individual annular object and in contact with said inclined conveyor surface with a stationary side wall along the side edge of at least one end part of the slats to cause said other annular objects to rotate and separate from the individual annular object on said supports.

3. Separation and transport apparatus for annular objects including a conveyor surface section and a sliding surface section separately formed on a conveyor surface and adjacent one another, said conveyor surface including a plurality of slats and having a horizontal charge zone, a sharply inclined individual transport zone, and a horizontal discharge zone;

a plurality of support plates projecting from said conveyor surface section each of such a size as to support only one annular object laid flat on said conveyor surface section, mounted at a larger pitch in the direction of transport than the maximum diameter of the annular objects being conveyed, said conveyor surface in said sharply inclined individual transport zone positioned such that any line traversing said conveyor surface and perpendicular to the edges thereof will be generally parallel to the horizontal; and a stationary sidewall erected along a side edge of said sliding surface section opposite said conveyor surface section.

4. The method for separating and transporting a quantity of annular objects on a conveyor system including a conveyor surface travelling from a loading zone up an inclined section to a discharge zone wherein the conveyor surface consists of a plurality of slats comprising the steps of:

laying on said conveyor surface a plurality of the annular objects, said conveyor surface having a width greater than two times the maximum diameter of the annular object being conveyed;

supporting in said inclined section one annular object on each of a plurality of support plates projecting from said conveyor surface, each of said support plates dimension so as to as to be able to support only one of the annular objects with said support plates spaced apart from one another at a larger pitch in the direction of transport in the maximum diameter of the annular objects being conveyed, said conveyor surface in said inclined section positioned such that any line traversing said conveyor surface and perpendicular to the edges thereof will be generally parallel to the horizontal;

guiding other annular objects in contact with said annular objects supported on said support plates and also in contact with said conveyor surface in said inclined section with a stationary side wall along the side edge of at least one end part of the slats to cause said other annular objects to rotate and separate from the individual annular object on said supports.

5. A system for transporting and separating annular objects comprising:

a moving conveyor surface travelling from a loading zone through an inclined zone to a discharge zone, said conveyor surface having a width sufficient to support two of the largest of said annular objects in a side-by-side relationship, said inclined zone positioned such that any line traversing said conveyor surface and perpendicular to the edges thereof will be generally parallel to the horizontal;

a plurality of support plates extending from said conveyor surface, said support plates mounted at a pitch in the direction of transport larger than the maximum diameter of the annular objects being conveyed and sized to support only one annular object laid flat on said conveyor surface;

a stationary side wall along the side edge of said inclined zone remote from said support plates for guiding others of said annular objects supported on said inclined section and not supported by one of said support plates.

6. A system for transporting and separating annular objects as recited in claim 5 further comprising:

a guide member affixed to said sidewall, said guide member projecting over an upper portion of said conveyor surface in said inclined zone.

7. A system for transporting and separating annular objects as recited in claim 6 wherein:

said guide member includes tapered side edges for contacting said annular objects.

8. A system for transporting and separating annular objects as recited in claim 5 wherein:

said support plates are trapezoidal having sloping side edges, a major parallel edge proximate to said conveyor surface, and a minor parallel edge located above said conveyor surface.

9. An apparatus for conveying and separating annular objects as recited in claim 1 further comprising:

a guide member affixed to said stationary sidewall, said guide member projecting over an upper portion of said conveyor in said inclined section.

10. An apparatus for conveying and separating annular objects as recited in claim 9 further comprising:

said guide member includes tapered side edges for contacting said annular objects.

11. An apparatus for conveying and separating annular objects as recited in claim 9 further comprising:

said support plates are trapezoidal having sloping side edges, a major parallel edge proximate to said conveyor surface, and a minor parallel edge located above said conveyor surface.

12. Separation and transport apparatus as recited in claim 3 further comprising:

a plurality of upright members extending from said slats proximate to a side edge of said conveyor surface section.

* * * * *